Patented Oct. 27, 1942

2,299,999

UNITED STATES PATENT OFFICE 2,299,999

SALT CURING COMPOSITION

Alfred Lippman, Jr., Weeks, La., assignor to Bay Chemical Company, Inc., New Orleans, La., a corporation of Louisiana No Drawing. Application November 7, 1939, Serial No. 303,319

3 Claims. (Cl. 99—143)

It is advantageous to retain salt in a moist condition for certain purposes; to prevent caking, to cause adherence to meats and other substances, to prevent or reduce the drying out of substances to which said salt may be applied for preservative or other purposes.

My invention consists in the addition of magnesium chloride to my salt, in manners hereinafter described, to achieve a good distribution of the magnesium chloride over the salt surfaces. This magnesium chloride is very deliquescent and hygroscopic, and retains moisture very tenaciously, event to the extent of absorbing moisture from the atmosphere. The covering on the surfaces of the salt crystals of what is in effect a solution of magnesium chloride keeps my salt crystals damp and moist.

The magnesium chloride may be introduced according to various ways.

The magnesium chloride may be dissolved in water, in which it is very soluble, and the initial water content is advantageous insofar that it immediately makes the salt moist without awaiting absorption from the atmosphere. Also, solutions are most easily mixed and evenly distributed upon salt surfaces. I prefer the use of between 0.3% and 2.5% of magnesium chloride, figured on the anhydrous basis; and between 0.5% and 3.0% moisture initially. With finely ground salt, these figures should be increased, because the additional salt surface requires more magnesium chloride and more water.

I may use finely ground magnesium chloride, mixing this powder with the salt, but this method does not give uniformity equal to that obtainable thru the use of solutions, unless thorough mixing is accomplished after magnesium chloride addition in the presence of a sufficiency of water to dissolve the magnesium chloride and spread the solution uniformly over the salt surface. The aqueous content may be secured either by adding water directly to the salt or the magnesium chloride may be allowed to absorb moisture from the air.

Another method which I may employ to produce my magnesium chloride is the admixture of muriatic acid with my salt, and then adding a powder of magnesite or any other magnesium compound which will react with the muriatic acid to produce magnesium chloride. This method, of course, offers the advantage of producing the magnesium chloride directly on the salt from commonly available materials all in one mixing operation.

I have found that when using magnesium chloride with salt, the addition of a small percentage of sugar will improve the taste and at the same time provide a tackiness or stickiness which is advantageous for some purposes, such as meat curing.

Furthermore, I have discovered that sugar and water together provide a degree of moisture retention which accentuates the effect of magnesium chloride alone; in fact, I have used sugar solutions without the magnesium chloride to good effect. I have found that sugar must be used by itself at least to 1% and up to 3% to retain a moist salt, and even higher with finely ground salt, and it is essential to have water admixed therewith; otherwise no effect will be observed; the sugar apparently adheres tenaciously to its aqueous content. Instead of sucrose sugar, I may use a soluble sweet hexose of the class of monoses, such as glucose, levulose, dextrose, etc., and impure mixtures of same. With sucrose, I get best results by dissolving the sugar in water to make a strong solution and then I mix this solution thoroughly with the salt. The water may vary between 0.5% and 3.0% and even higher for finely ground salt. The sugar may be added according to procedures already described for magnesium chloride.

I claim:

1. The method of making a damp, moist salt comprising thoroughly mixing with granules of common salt an aqueous solution substantially saturated with magnesium chloride and with a deliquescent sugar, in proportion to yield a final product containing 0.3 to 2.5 percent of magnesium chloride on the anhydrous basis, 0.5 to 3.0 percent of water, and 1 to 3 percent of a soluble sweet sugar.

2. A damp, moist salt consisting of a mixture of granules of common salt with 0.3 to 2.5 percent of magnesium chloride on the anhydrous basis, 0.5 to 3.0 percent of water, and 1 to 3 percent of a sweet sugar dissolved in said water.

3. A damp, moist salt consisting of a mixture of granules of common salt with 0.3 to 2.5 percent of magnesium chloride on the anhydrous basis, 0.5 to 3.0 percent of water, and 1 to 3 percent of sugar dissolved in said water.

ALFRED LIPPMAN, Jr.